United States Patent [19]
Markley et al.

[11] Patent Number: 4,821,399
[45] Date of Patent: Apr. 18, 1989

[54] METHOD OF ASSEMBLING A REFRIGERATOR

[75] Inventors: Joseph P. Markley; William D. Irish, both of Louisville, Ky.

[73] Assignee: General Electric Company, Louisville, Ky.

[21] Appl. No.: 156,976

[22] Filed: Feb. 18, 1988

[51] Int. Cl.4 .................... B23P 25/00; B29C 67/22
[52] U.S. Cl. ........................... 29/458; 29/460; 264/46.5; 264/46.6; 312/214
[58] Field of Search ............... 29/458, 460, 526 R; 52/127 R, 309.11, 743; 264/45.1, 46.4, 46.5, 46.6, 261, 278; 312/214

[56] References Cited

U.S. PATENT DOCUMENTS

| | | | |
|---|---|---|---|
| 2,653,139 | 9/1953 | Sterling | 260/2.5 |
| 3,137,744 | 6/1964 | Burrus | 264/45 |
| 3,310,616 | 3/1967 | Beary | 264/45 |
| 3,383,440 | 5/1968 | Chaldekas | 264/45 |
| 3,440,308 | 4/1969 | Carbary et al. | 264/45 |
| 3,446,881 | 5/1969 | Poole | 264/45 |
| 3,684,342 | 8/1972 | Jansen | 312/214 |
| 4,191,434 | 3/1980 | Powell et al. | 312/214 |
| 4,606,112 | 8/1986 | Jenkins et al. | 29/526 R |
| 4,674,257 | 6/1987 | Rose | 264/278 |

FOREIGN PATENT DOCUMENTS 59-127737 7/1984 Japan .................. 264/46.5

Primary Examiner—Jan H. Silbaugh
Assistant Examiner—Allan R. Kuhns
Attorney, Agent, or Firm—Frederick P. Weidner; Radford M. Reams

[57] ABSTRACT

A method of assembling a refrigerator having a fresh food compartment and a freezer compartment separated by a mullion partition, the refrigerator having an outer metal casing with side walls, an inner liner and foamed-in-place thermal insulation between the metal casing and liner wherein the insulation has a void cavity adjacent the mullion partition. The metal casing is formed to have a vertical front face perpendicular to the side walls and a reinforcing nut strip is placed in the front face. The front face and nut strip aligned screw receiving apertures. A nozzle is inserted through the aligned apertures into the insulation void cavity and foamable hot melt material is forced through the nozzle into the insulation void cavity to fill the cavity. The nozzle is then withdrawn from the aligned apertures and a fastener is secured through the aligned apertures.

5 Claims, 4 Drawing Sheets

METHOD OF ASSEMBLING A REFRIGERATOR

BACKGROUND OF THE INVENTION

In the construction of a household refrigerator having a freezer compartment and a fresh food compartment and an outer case there is an insulating mullion partition between the two compartments and the partition is constructed in such a manner that there is a mullion bar across the front of the partition and secured to the outer case. The freezer and fresh food compartments are closed by separate access doors which are hingedly attached to the cabinet outer case. For the proper fit of the doors for the freezer and fresh food compartments, it is important that the proper width of the refrigerator cabinet be maintained and that the loads on the doors not produce excessive deflection of the cabinet, and further that the door openings are square and more importantly remain square under normal door loadings. The reason for the proper fit of the doors is so the door sealing gaskets can effectively seal against the cabinet to prevent thermal leakage.

Generally household refrigerators employ a sheet metal outer casing and an inner plastic liner with a foamed-in-place thermal insulation resin interposed between the outer case and the inner liner. The liquid/gas foam is introduced into the space between the outer casing and inner plastic liner and expands throughout the space and then is solidified by curing. Prior to the foaming operation it is necessary to cover all of the holes in the liner and outer metal shell so that the foam material does not pass through these holes and solidify, producing a detrimental and unsightly appearance to the user of the refrigerator.

It is customary that the center hinge for the freezer and fresh food access doors be interchangeable from one side of the refrigerator to the other. These hinges must necessarily be structurally rigid and to accommodate fastening the hinges to the outer metal casing, there must be fastener receiving apertures through the front face of the outer casing and reinforcing metal nut strips in the front face for securing the hinge bracket. With such a structural arrangement it is common practice to cover the apertures with a gas permeable material such as fiberglass which will allow the air to escape from between the outer metal casing and the inner liner during the foaming operation but restrict the flow of the foam therethrough. This practice results in an insulation void cavity adjacent the mullion partition resulting in an air path from the freezer compartment to the front face of the outer metal shell. The cold air from the freezer compartment causes the front face of the refrigerator to be cold and with warm moist room ambient air contacting the cold surface of the refrigerator condensation or "sweating" occurs. In constructing refrigerators it is desirable to have all voids in the insulation filled and this invention relates to a method of constructing a refrigerator cabinet that fills the insulation void cavity in the mullion partition area to minimize sweating.

SUMMARY OF THE INVENTION

A method of assembling a refrigerator having a fresh food compartment and a freezer compartment separated by a mullion partition, said refrigerator having an outer metal casing with side walls, an inner liner and foamed-in-place thermal insulation between the metal casing and liner, said insulation having a void cavity adjacent the mullion partition. The method includes forming the metal casing having a vertical front face perpendicular to the side walls of the metal casing, said front face being formed to have a right angle bend relative to the side wall and a first U-shaped portion which includes a first outer wall perpendicular to the side wall and extending from the right angle bend to the first U-shaped portion, a second inner wall spaced inwardly from the first outer wall, the second inner wall being reversely bent to form a third wall and provide a second U-shaped portion formed between the second inner wall and the third wall, said first, second and third walls being in spaced parallel planes and having aligned screw receiving apertures therethrough.

The liner of the refrigerator cabinet 10 is vacuum formed from plastic material and has an outwardly directed peripheral flange. The liner is placed inside the metal casing in spaced relationship so that the flange of the liner is received between the second and third wall of the front face and spaced from the second U-shaped portion. A reinforcing nut strip having a screw receiving aperture is placed between the second wall of the front face and the peripheral flange of the liner in alignment with the front face screw receiving apertures. A nozzle having a side wall and end wall is inserted through the aligned apertures into the insulation void cavity and foamable hot melt material is forced through the nozzle into the insulation void cavity. When the foamable hot melt material fills the void cavity the nozzle is withdrawn from the aligned apertures and a fastener is secured through the aligned apertures.

DESCRIPTION OF THE PREFERRED EMBODIMENT

Figure 1:
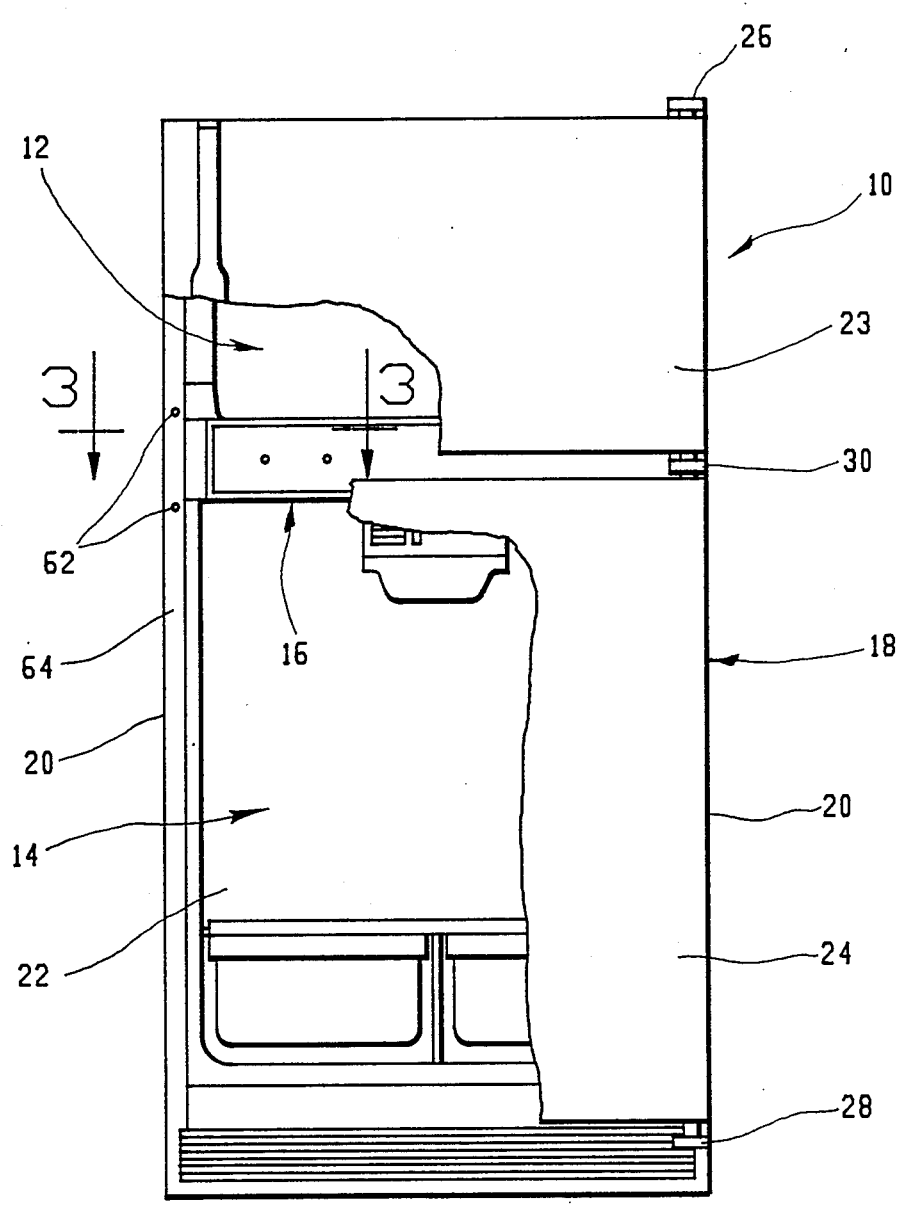
FIG. 1 is a front elevational view with parts broken away of a household refrigerator incorporating the present invention.

With reference to FIG. 1, there is shown a refrigerator cabinet 10 having a below-freezing temperature freezer compartment 12 at the top of the refrigerator and an above-freezing temperature fresh food compartment 14 at the bottom of the refrigerator with the freezer and fresh food compartments being separated by a mullion partition 16. The refrigerator cabinet comprises an outer metal casing 18 having side walls 20 and an inner liner 22 usually formed by vacuum molding plastic material. The freezer compartment 12 has an access door 23 and the fresh food compartment 14 has an access door 24. The refrigerator shown in FIG. 1 has the doors hingedly secured to the refrigerator on the right hand side by means of a top hinge 26 pivotly retaining the top portion of the freezer compartment access door 23 and a bottom hinge 28 pivotly supporting the bottom of the fresh food compartment access door 24. There is a T-shaped center hinge bracket 30 (FIG. 2) that pivotly retains the bottom of the freezer access door 22 and the top of the fresh food access door 24. It will be understood that it is common practice in manufacturing refrigerators to have the door hinges reversible from one side to the other side so that the opening of the access doors will accommodate the kitchen arrangement of the user. When the door hinges are on the left hand side of the refrigerator shown in FIG. 1 the door handles are removed and placed on the right hand side, again as is common practice in the refrigerator manufacturing industry.

Figure 2:
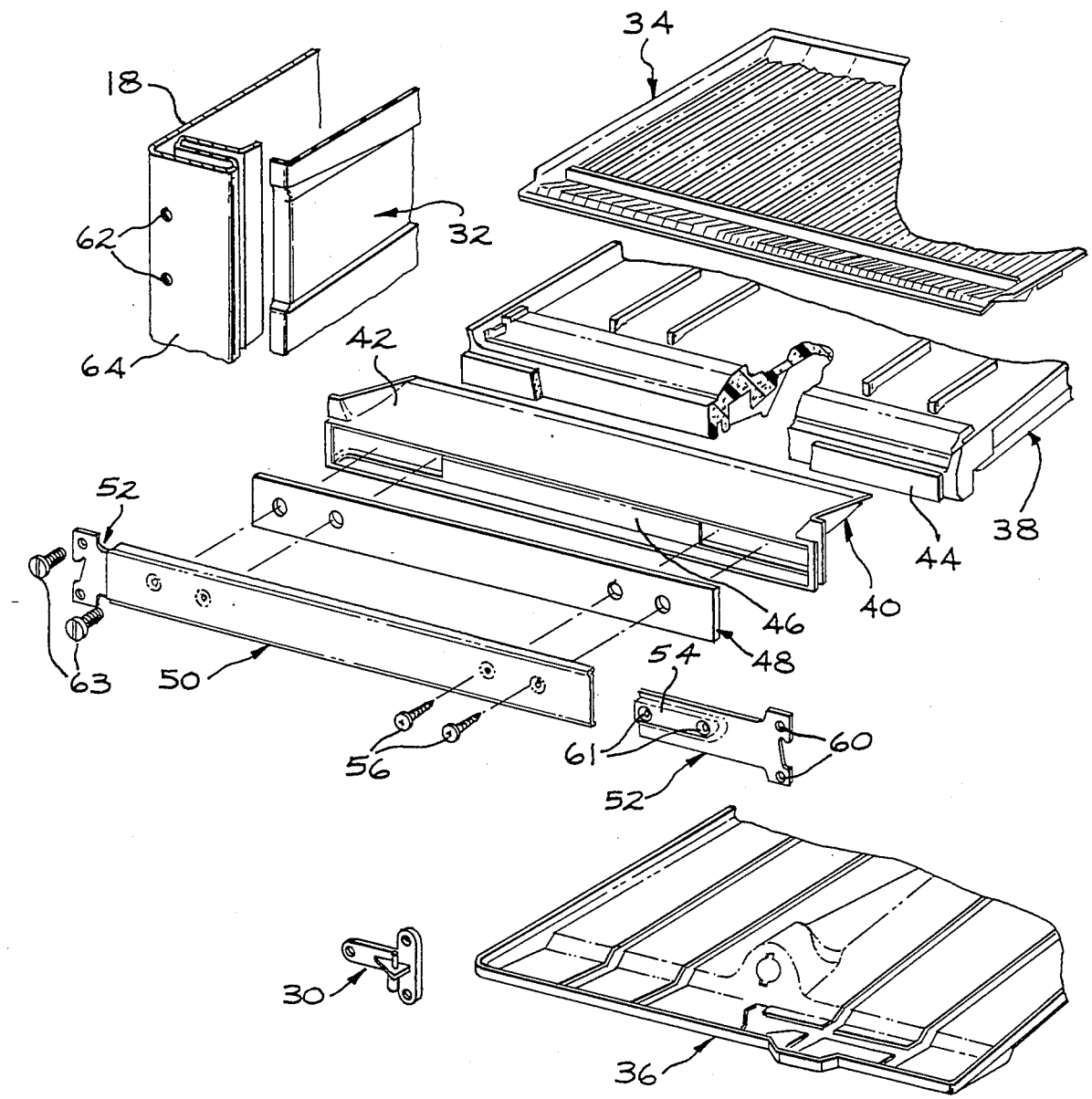
FIG. 2 is an exploded perspective view showing the mullion partition assembly of the refrigerator shown in FIG. 1.
Figure 3:
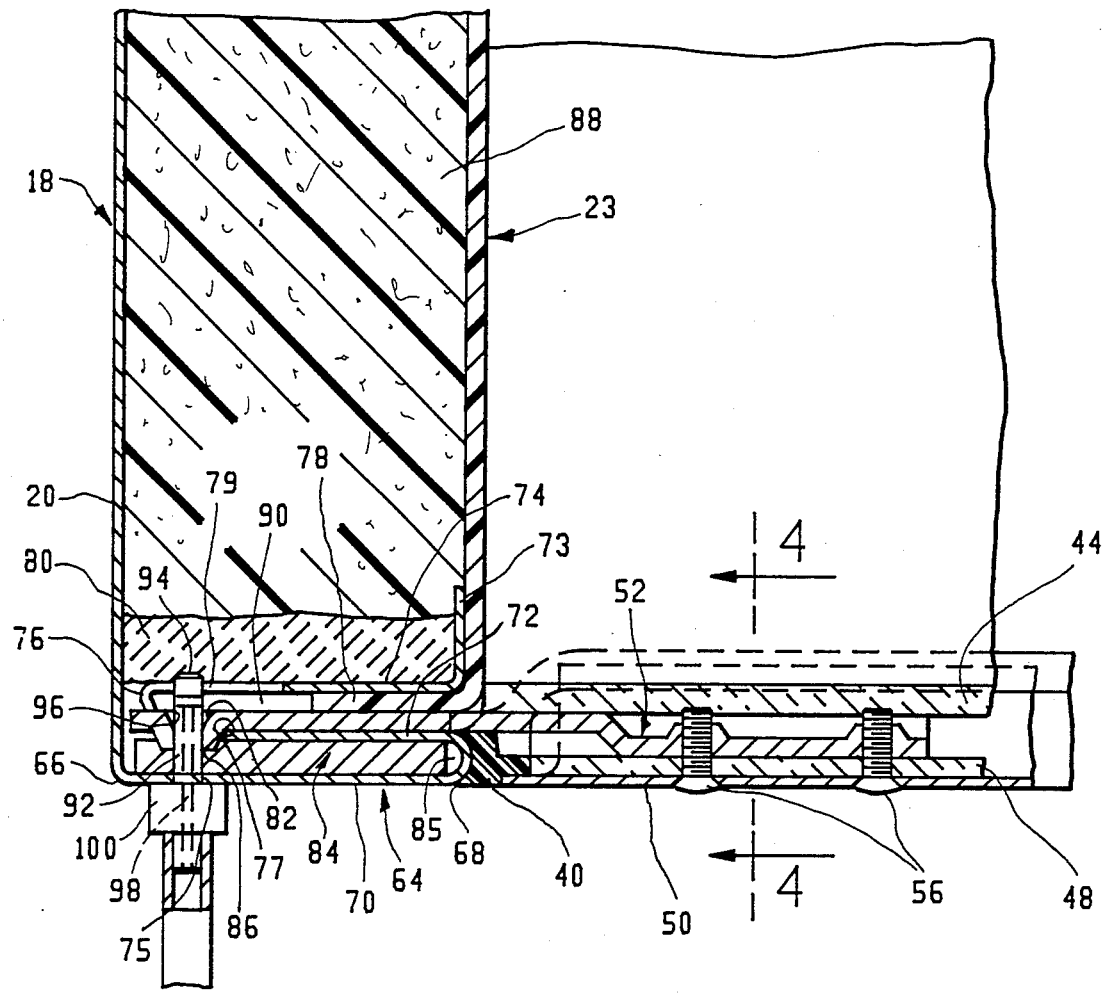
FIG. 3 is a cross-sectional view of a portion of the refrigerator shown in FIG. 1 taken along lines 3—3 of FIG. 1.
Figure 4:
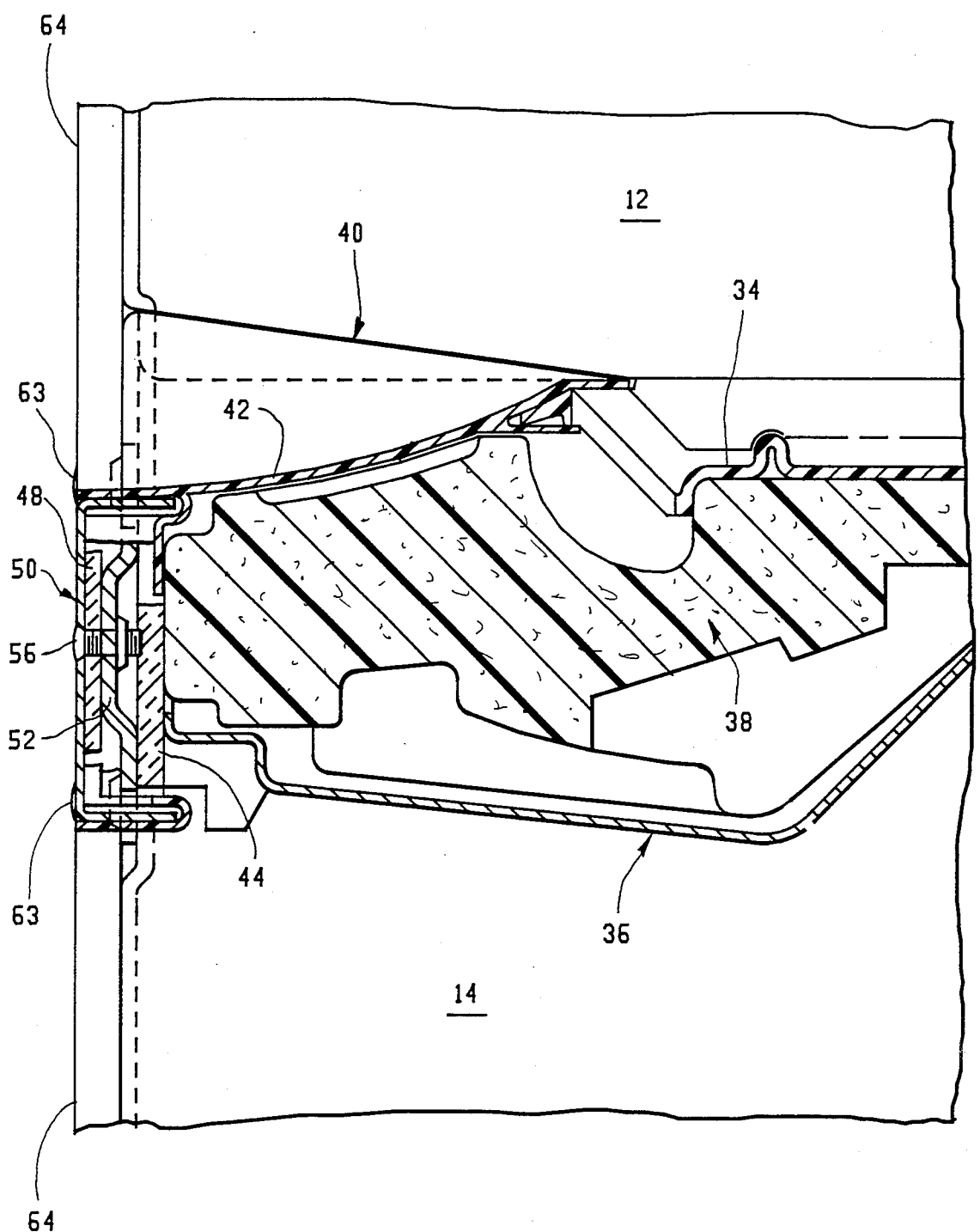
FIG. 4 is a cross-sectional view taken along lines 4—4 of FIG. 3.

With reference to FIGS. 2-4, there is shown the assembly of the mullion partition 16. The mullion partition serves several purposes, one of which is to be an insulating member separating the freezer compartment which is maintained at below freezing temperatures and the fresh food compartment which is maintained at above freezing temperatures. The mullion partition also forms the floor of the freezer compartment and the ceiling of the fresh food compartment. In addition, the mullion partition and some of its structural elements are used to strengthen the refrigerator cabinet in the mullion area to prevent the cabinet from bowing outwardly during the insulation foaming operation and also support the center hinge pin which in turn must support the weight of the freezer and fresh food access doors without distortion of the cabinet and doors which otherwise would detrimentally affect the gasket sealing of the compartments. Thus, it is important that the mullion partition have rigid reinforcing members for sufficient structural support.

During the vacuum forming of the plastic inner liner 22 there are channels 32 (FIG. 2) formed in each opposite side wall of the liner where the mullion partition is to be secured. The mullion partition assembly includes an upper plastic ribbed panel 34 which when assembled into the refrigerator functions as the floor for the freezer compartment 12. The mullion partition also includes a bottom plastic panel 36 which when assembled into the refrigerator forms the top wall or ceiling of the fresh food compartment 14. Sandwiched between the upper and bottom panels is a thermal insulation member 38 that is usually formed from styrofoam plastic material and is captured and retained between the upper and bottom panels during assembly of the mullion partition into the refrigerator cabinet 10. The front of the mullion partition includes a plastic appearance panel 40 that has a concave upper surface 42 at the front thereof and this appearance panel 40 snaps over and retains the front portion 44 of the thermal insulation member 38. In front of the forward surface 46 of the appearance panel 40 is an elongated strip 48 made of thermal insulation material such as fiberglass. In front of the thermal insulation strip 48 is a metal mullion bar 50 which has at each end thereof a reinforcing nut strip 52. The nut strips are secured to the mullion bar 50 as by screws 56 driven into apertures 61 in the inner end 54. The nut strips 52 have an outer end 58 with two fastener receiving apertures 60 which are in alignment with vertically aligned fastener receiving apertures 62 in the front face 64 of the outer metal casing 18 and are secured to the outer metal casing 18 by screws 63. During initial assembly of the mullion bar 50 to the outer metal case 18 only one of these screws 63 in each of the nut strips 52 is used to attach the mullion bar. The reason will be explained later.

With reference particularly to FIG. 3, the structural arrangement of attaching the mullion bar 50 and the reinforcing nut strips 52 to the refrigerator cabinet will now be discussed. The outer metal casing 18 has the vertical front face 64 perpendicular to the side walls 20 of the metal casing and the front face is formed to have a right angle bend 66 relative to the side wall 20, a first U-shaped portion 68, and a first outer wall 70 perpendicular to the side wall 20 extending from the right angle bend 66 to the first U-shaped portion 68. A second inner wall 72 is spaced from the first outer wall 70 and the second inner wall is reversely bent to form a third wall 74 and provide a second U-shaped portion 76 formed between the second inner wall 72 and the third wall 74. The third wall 74 has a terminal end 73 bent at a right angle to the plane of the third wall. The first, second and third walls are in spaced apart parallel planes and each of them have screw receiving apertures 75, 77, 79 respectively therethrough and in alignment with each other.

The liner 23 is vacuum formed from plastic material and has formed in it an outwardly directed peripheral flange 78 and after forming the inner liner, the liner is placed inside the metal casing 18 in spaced relationship so that the peripheral flange 78 is received between the second wall 72 and the third wall 74 of the front face 64 and spaced from the second U-shaped portion 76. Prior to inserting the peripheral flange 78 into the outer metal casing, a gas permeable strip of material such as fiberglass strip 80 is placed over aperture 79 in the third wall 74 and any other opening between the side wall 20 and the terminal end 73 of the front face third wall so that during the insulation foaming operation the air trapped between the outer metal casing 18 and the inner liner 23 may escape. The foam resin, however, is stopped by the fiberglass strip 80 and thereby prevented from leaking through the apertures and openings in the front face 64. The reinforcing nut strip 52 also has a screw receiving aperture 82 and the nut strip is placed between the second wall 72 of the front face 64 and the liner peripheral flange 78 and has its screw receiving aperture in alignment with the screw receiving apertures 75, 77 and 79 in the front face.

In the preferred embodiment the refrigerator cabinet also has a reinforcing bar 84 which, as can be seen in FIG. 3, is located in the space 85 between the first outer wall 70 and the second inner wall 72 of the front face 64. In the mullion partition area the reinforcing bar 8 would also have a screw receiving aperture 86 in alignment with the other screw receiving apertures 75, 77 and 79 in the front face 64 and aperture 82 in the nut strip 52.

As can be seen particularly in FIG. 3, the foam insulation 88 is stopped by the fiberglass strip 80 during the foaming operation thereby leaving a void cavity 90 adjacent the mullion partition after the foam has solidified. This cavity provides an air passageway that allows cold air from the freezer compartment to flow and impinge against the front face 64 of the refrigerator in the mullion partition area resulting in the front face being colder than the ambient room air temperature. Moisture in the ambient air condenses on the cold surface of the front face and causes "sweating". By this invention the void cavity 90 is filled with thermal insulation and thereby blocks the cold air flow and prevents the cabinet from sweating in the front face area. A nozzle 92 having a slightly smaller diameter than the screw receiving apertures 75, 77 and 79 through the front face 64, aperture 86 in the reinforcing bar 84 and aperture 82 in the nut strip 52 is inserted through the aligned apertures that are to subsequently receive the screw 63 that has not as yet been driven to attach the nut strip 52 to the outer metal casing 18. The nozzle 92 is dimensioned to be received snuggly in the apertures. The nozzle in the preferred embodiment has an end wall 94 and a side wall 96 with conduit means 98 passing through the inside of the nozzle and exiting the side wall 96. In operation the nozzle 92 is inserted through the aligned apertures 75, 77 and 79 in the front face, aperture 86 in the reinforcing bar 84, aperture 82 in the nut strip 52, and void cavity 90 until the nozzle end wall 94 pushes against the fiberglass strip 80 as shown in FIG. 3. The nozzle also has a back-up stop means 100 which abuts the front surface of the first outer wall 70 of the front face 64 when the nozzle is inserted to the proper predetermined depth. When the nozzle is so inserted, foamable hot melt material is forced through the nozzle into the insulation void cavity 90. The snug fit between the nozzle and the apertures prevents the foamable hot melt from flowing around the nozzle and back out the apertures. When the void cavity is filled with the foamable hot melt material, the nozzle is withdrawn from the aligned apertures and the second fastener 63 for securing the mullion bar 50 to the outer metal case 18 by the nut strips 52 at each end of the mullion bar 50 is secured through the aligned apertures to complete the operation. The foamable hot melt material may be one of many available in the marketplace and an example of one such material found suitable is marketed by Findlay Adhesives Inc. located in Elm Grove, Wis. The nozzle and associated equipment is also readily available in the marketplace and one such manufacturer of hot melt equipment is Nordson Corporation who have a packaging and assembling division in Fairfield, Ohio.

Depending upon the particular refrigerator cabinet, the size of the void cavity 90 can be measured and based on that it can be determined how much of the foamed hot melt is needed to fill the cavity. Consequently, there can be a timed "shot" of hot melt based on the amount of pressure and flow rate of the hot melt through the nozzle. One of the purposes of having the hot melt shot timed is so that the right amount o hot melt is deposited in the void cavity as otherwise if too much foamable hot melt is used, it has a tendency to run out of the fastener apertures once the nozzle is removed. If too little foamable hot melt is used, then the void cavity 90 is not filled sufficiently. The timed shot also is of benefit from a manufacturing automated assembly standpoint. It should be understood that this operation takes place in the front face 64 on both sides of the refrigerator. Whether it is the hinge side or the opposite side, the process is the same. Should it be the hinge side of the refrigerator the hinge bracket 30 is also secured to the cabinet by the fastening means such as fastening screws 63 and 56 after the foamable hot melt has been delivered to the void cavity 90 and the nozzle 92 withdrawn from the apertures.

While, in accordance with the Patent Statutes, there has been described what at present is considered to be the preferred method of the invention, it will be obvious to those skilled in the art that various changes and modifications may be made thereto with departing from the invention. It is, therefore, intended by the appended claims to cover all such changes and modifications as fall within the true spirit and scope of the invention.

What is claimed is:

1. Method of assembling a refrigerator having a fresh food compartment and a freezer compartment separated by a mullion partition, said refrigerator having an outer metal casing with side walls, an inner liner and foamed-in-place thermal insulation between the metal casing and liner comprising:

forming the metal casing having a vertical front face perpendicular to the side walls of the metal casing, said front face being formed to have a right angle bend relative to the side wall and a first U-shaped portion which includes a first outer wall perpendicular to the side wall and extending from the right angle bend to the first U-shaped portion, a second inner wall spaced from the first outer wall, the second inner wall being reversely bent to from a third wall and provide a second U-shaped portion formed between the second inner wall and the third wall, said first, second and third walls being in spaced parallel planes and having aligned screw receiving apertures therethrough adjacent the mullion partition, vacuum forming the liner from plastic material, said liner having an outwardly directed peripheral flange, placing a foam stop strip of gas permeable material over the screw receiving aperture on the surface of the third wall of the front face opposite from the second wall and adjacent the mullion partition, placing the liner inside the metal casing in spaced relationship so that the flange is received between the second and third wall of the front face and spaced from the second U-shaped portion thereby forming a void cavity adjacent the mullion partition, foaming the space between the outer metal casing and the liner other than the void cavity, placing a reinforcing nut strip having a screw receiving aperture between the second wall of the front face and the liner in alignment with the front face screw receiving apertures, inserting a nozzle with conduit means and having a side wall and end wall through the aligned apertures into the insulation void cavity, said nozzle having a slightly smaller diameter than the screw receiving apertures to provide a snug fit between the nozzle and the apertures, forcing a foamable hot melt material through the nozzle conduit means into the insulation void cavity, retaining the nozzle in the void cavity until the cavity is filled with foamable hot melt material, withdrawing the nozzle from the aligned apertures, and securing a fastener through the aligned apertures to secure the reinforcing nut strip to the front face.

2. The method of claim 1 wherein a reinforcing bar is placed between the first and second wall of the front face, said bar having an aperture in alignment with the screw receiving apertures in the front face and hinge bracket.

3. The method of claim 1 wherein the nozzle is inserted through the aligned apertures sufficiently to abut the end wall thereof against the foam stop strip of material prior to forcing the hot melt material into the insulation void cavity.

4. The method of claim 3 wherein the conduit means through the nozzle exits the side wall thereof.

5. The method of claim 1 wherein the nozzle has back-up stop means which abuts the front surface of the first outer wall of the front face when the nozzle is inserted into the void cavity adjacent the mullion partition.

* * * * *